US011567924B2

(12) United States Patent
Paluch et al.

(10) Patent No.: US 11,567,924 B2
(45) Date of Patent: Jan. 31, 2023

(54) PRODUCT USAGE DISCOVERY SIGNATURE BASED ON DATABASE TABLE CONTENT CHANGES

(71) Applicant: International Business Machines Corporation, Armonk, NY (US)

(72) Inventors: Michal Paluch, Cracow (PL); Tomasz Hanusiak, Cracow (PL); Andrzej Pietrzak, Podleze (PL); Michal Maciej Zalas, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 16/830,354

(22) Filed: Mar. 26, 2020

(65) Prior Publication Data

US 2021/0303545 A1 Sep. 30, 2021

(51) Int. Cl.
*G06F 16/23* (2019.01)
*G06F 16/21* (2019.01)

(52) U.S. Cl.
CPC ........ *G06F 16/2358* (2019.01); *G06F 16/211* (2019.01); *G06F 16/2386* (2019.01)

(58) Field of Classification Search
None
See application file for complete search history.

(56) References Cited

U.S. PATENT DOCUMENTS

| 7,925,635 | B1 | 4/2011 | Ravulur | |
|---|---|---|---|---|
| 8,473,607 | B2 | 6/2013 | Enscoe | |
| 9,372,685 | B1 | 6/2016 | Luettge | |
| 10,628,263 | B1* | 4/2020 | Cowen | G06F 11/1435 |
| 10,990,581 | B1* | 4/2021 | Jain | G06F 11/1471 |
| 2001/0011285 | A1* | 8/2001 | Kanno | G06F 16/9562 |
| | | | | 715/229 |
| 2016/0179867 | A1* | 6/2016 | Li | G06F 3/065 |
| | | | | 707/634 |
| 2018/0004795 | A1* | 1/2018 | Kalhan | G06F 16/217 |
| 2018/0018365 | A1* | 1/2018 | Hanusiak | G06F 16/289 |
| 2018/0196684 | A1* | 7/2018 | Pengfei | G06F 21/64 |
| 2018/0321927 | A1 | 11/2018 | Borthakur | |

\* cited by examiner

*Primary Examiner* — Amresh Singh
(74) *Attorney, Agent, or Firm* — David B. Woycechowsky

(57) ABSTRACT

Technology for logging application usage based on monitoring of read or change operations on database elements and then using the information from log data to determine application usage states (for example, active, inactive) in time.

3 Claims, 5 Drawing Sheets

400a

| NAME | FAVORITE VEGETABLE | LUCKY # |
|---|---|---|
| ABEL | CARROT | 2 |
| BAKER | BEET | N/A |
| CHARLIE | GREEN BEAN | 6 |

| NAME | FAVORITE VEGETABLE | LUCKY # |
|---|---|---|
| ABEL | CARROT | 2 |
| BAKER | BEET | N/A |
| CHARLIE | GREEN BEAN | 6 |
| DARLA | MILKSHAKE | 110110 |

| NAME | FAVORITE VEGETABLE | LUCKY # |
|---|---|---|
| ABEL | CARROT | 2 |
| BAKER | BEET | N/A |
| DARLA | MILKSHAKE | 110110 |

| LUCKY # | FAVORITE VEGETABLE | NAME |
|---|---|---|
| 2 | CARROT | ABEL |
| N/A | GREEN BEAN | BAKER |
| 110110 | MILKSHAKE | DARLA |

| LUCKY # | FAVORITE VEGETABLE | NAME |
|---|---|---|
| 2 | CARROT | ABEL |
| $\pi$ | GREEN BEAN | BAKER |
| 110110 | MILKSHAKE | DARLA |

| LUCKY # | 2 | $\pi$ | 110110 |
|---|---|---|---|
| FAVORITE VEGETABLE | CARROT | GREEN BEAN | MILKSHAKE |
| NAME | ABEL | BAKER | DARLA |

FIG. 4F

PRODUCT USAGE DISCOVERY SIGNATURE BASED ON DATABASE TABLE CONTENT CHANGES

BACKGROUND

The present invention relates generally to the field of software use signatures.

It is known that certain computer software applications create and/or use databases. These databases generally include one, or more, tables of data. Sometimes more than one application shares the same database and database tables. As the applications associated with a database operate, they create tables, modify tables and/or delete tables. For example, a given application may create, and later delete a temporary table in its associated database. Possible modifications typically include: add row, add column, delete row (sometimes referred to as a record), delete column (sometimes referred to as a field that runs through some, or all, of the records of a table), delete a cell, replace a cell with new and/or modified data and/or add data to an empty cell.

SUMMARY

According to an aspect of the present invention, there is a method, computer program product and/or system that performs the following operations (not necessarily in the following order): (i) receiving first component data indicating that a first component is used to effect changes to a first database; (ii) logging a plurality of change operations on the first database to obtain a first database change log; and (iii) determining a first usage state of a first component that is used to make changes to the first database based, at least in part, upon the first database change log.

BRIEF DESCRIPTION OF THE DRAWINGS

FIGS. 4A to 4F are views of a table generated by the first embodiment system respectively generated at six different points in time;

DETAILED DESCRIPTION

Figure 1:
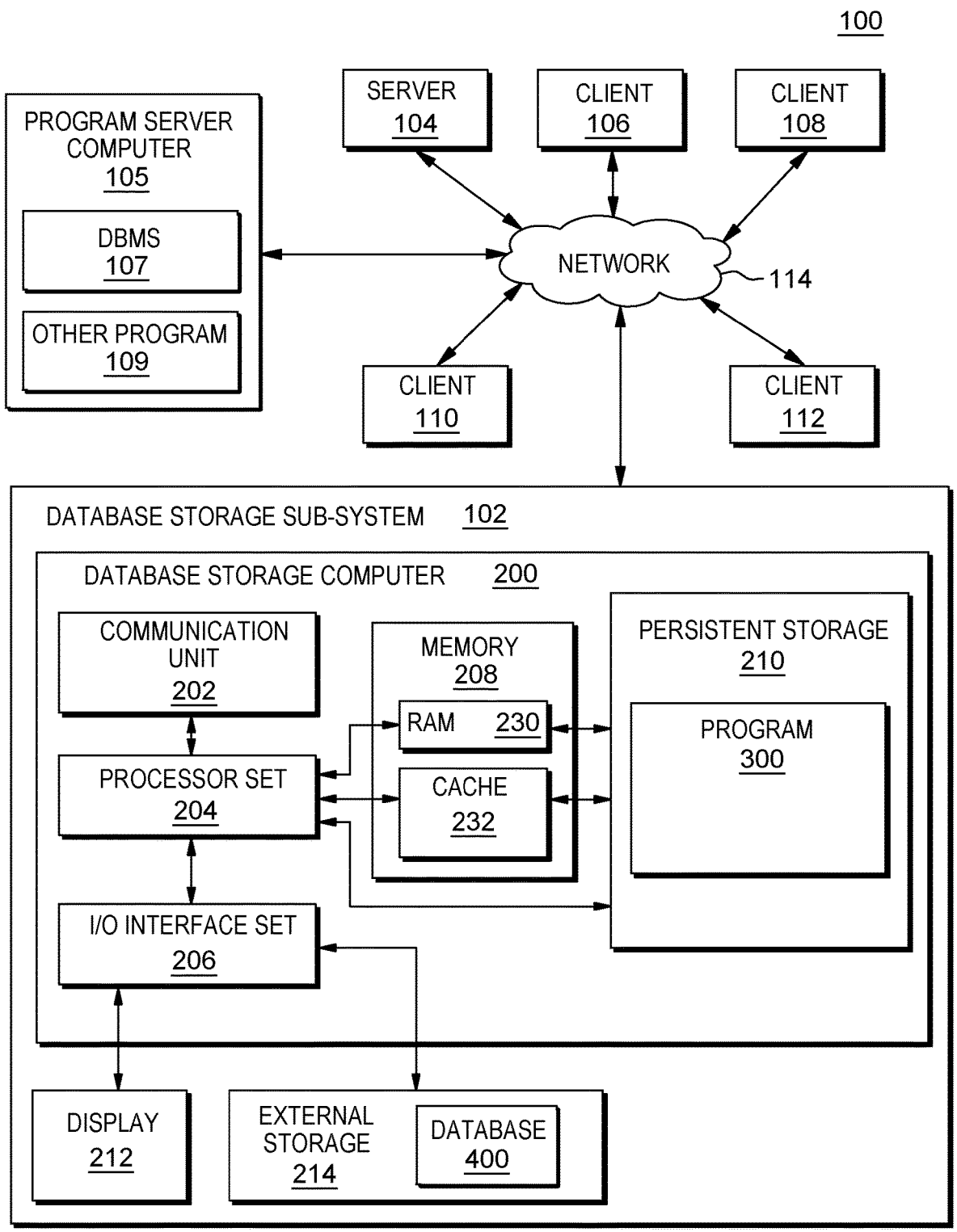
FIG. 1 is a block diagram view of a first embodiment of a system according to the present invention.

Technology for logging change operations that make changes to a database and then using data in the database change log to determine usage states (for example, active, inactive) of components used to make the changes to the database that are reflected in the change log. This Detailed Description section is divided into the following subsections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Enterprise networked computers system 100 includes: database storage subsystem 102 (sometimes herein referred to, more simply, as subsystem 102); server subsystem 104; client subsystems 106, 108, 110, 112; program sever computer 105 (including database management system program 107 and other program 109) and communication network 114. Database storage subsystem 102 includes: database storage computer 200; communication unit 202; processor set 204; input/output (I/O) interface set 206; memory 208; persistent storage 210; display 212; external storage 214 (including database table 400); random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External storage 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
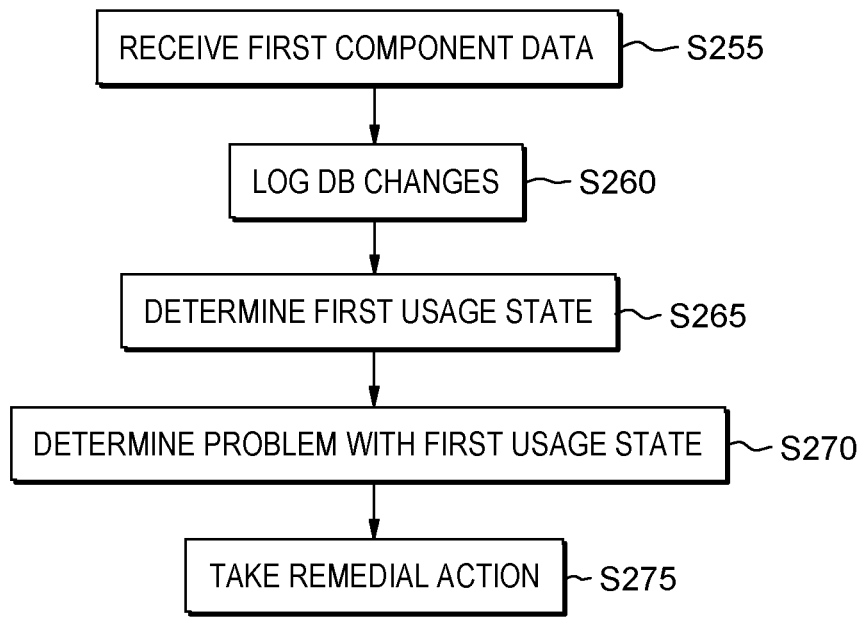
FIG. 2 is a flowchart showing a first embodiment method performed, at least in part, by the first embodiment system.
Figure 3:
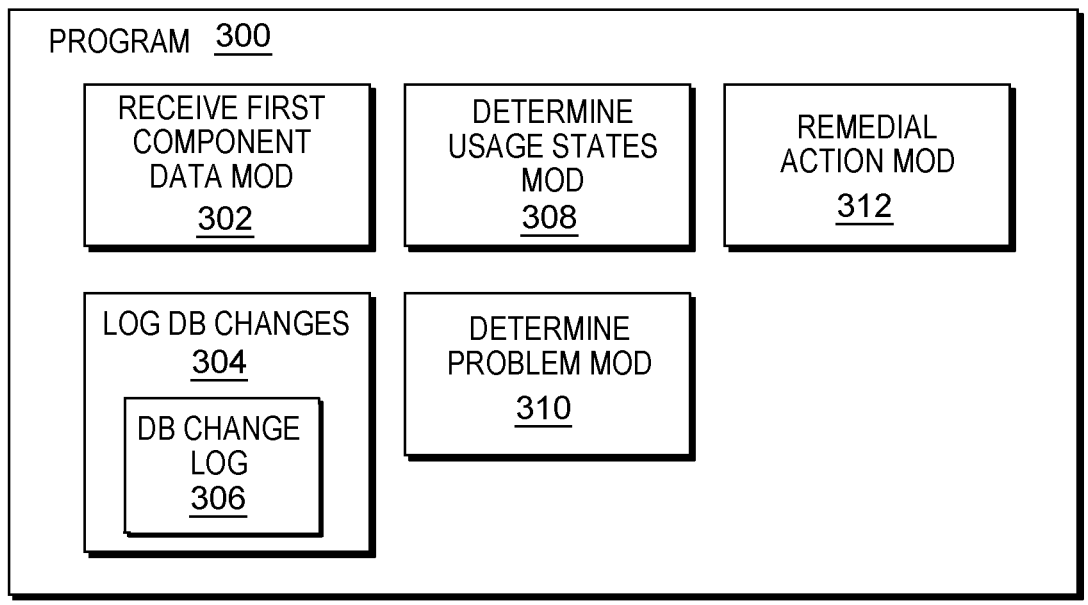
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where receive first data component module ("mod") 302 receives "first component data" that indicates that a first component is used when making changes to database 400 stored and maintained in external storage 214 of database storage system 102. In this example, the first component is database management system program (DBMS) 107 that is running on program server computer 105. In other words, whenever a change is made to database 400, that change must go through the DBMS program, so it is understood that when any changes are made to database 400, then that necessarily means that the DBMS is being actively used.

In various embodiments of the present invention, the first component may be: (i) a piece of software used to make a change to a database; and/or (ii) a piece of computer hardware used to make a change to a database.

In various embodiments of the invention, various types of software take the role of "first component" and thereby be effectively monitored by tracking database changes. Some of these various types of software include: database management system software. The primary goal is not to monitor the database itself, but the application which uses the database—by storing, writing data to it. So although the embodiment of system 100 checks contents in the database to capture changes, it does not "monitor" the database itself.

Processing proceeds to operation S260, where log database (DB) changes mod 304 logs changes to database 400 by adding entries to DB change log 306. As shown in FIGS. 4A to 4F, the following five (5) database changes are logged: (i) at 10:01 am, a row for Darla is added to the table (compare table 400a of FIG. 4A with table 400b of FIG. 4B); (ii) at 10:15 am, the row for Charlie is deleted from the table (compare table 400b of FIG. 4B with table 400c of FIG. 4C); (iii) at 10:21 am, the order of the columns of the table is changed (compare table 400c of FIG. 4C with table 400d of FIG. 4D); (iv) at 10:31 am, a value for Baker's lucky number is added in the appropriate cell of the table (compare table 400d of FIG. 4D with table 400e of FIG. 4E); and (v) at 11:03 am, the rows and columns of the table are transposed (compare table 400e of FIG. 4E with table 400f of FIG. 4F). In this example, these various changes are made by various clients (for example, employees of the enterprise) through client subsystems 104, 106, 108, 110, 112, communication network 114 and DBMS 107 of program server computer 105.

Processing proceeds to operation S265, where determine usage states mod 308 determines usage states of DBMS 107 as follows: (i) before 10:01 am, the usage state of DBMS 107 is inactive; (ii) from 10:01 am to 11:03 am, the usage state of DBMS 107 is active; and (iii) after 11:03 am, the usage state of DBMS 107 is inactive.

Processing proceeds to operation S270, where determine problem mod 310 determines that the usage states of the DBMS, determined at the previous operation, are indicative of a problem. In this example, the specific problem is that DBMS 107 is only supposed to be actively used between 10:00 am and 11:00 am, so that other program 109 can be used at all other times. However, because the active state of the DBMS extended in time until 11:03 am, this means that this rule was violated. The example of the method of flow chart 250 is one of possible scenarios, but it may be considered as a sort of a border case, or a pedagogical example. Alternatively, other embodiments consider various scenarios that are a bit more general. These more general scenarios allow capture of changes in general to determine/ confirm the application is used and act based on this information (for example, plan billing, plan reorganization of software installs, etc.).

Processing proceeds to operation S275 where remedial action mod 312 takes a remedial action. In this example, the remedial action is that mod 312 sends an email to the email account of the system administrator (not separately shown in FIG. 1) to indicate that the DBMS was active after 11:00 am.

III. FURTHER COMMENTS AND/OR EMBODIMENTS

Some embodiments of the present invention recognize the following facts, potential problems and/or potential areas for improvement with respect to the current state of the art: (i) there are many various ways that software usage can be discovered, however discovery of application use is not easy in all cases; and/or (ii) identification of a database being used by a given application is a known subject.

Some embodiments of the present invention may include one, or more, of the following operations, features, characteristics and/or advantages: (i) in order to make discovery of usage of certain application, a new type of software use signature (see definition of "signature," below, in the DEFINITIONS sub-section of this Detailed Description section) is employed; (ii) database tables content changes facilitate discover of application(s) running using local as well as remote databases and magnitude of use; (iii) this allows machine logic to distinguish between "stand by" and "full active" use of the application instance; (iv) a majority of enterprise level applications utilize database(s) as the back-end; and/or (v) changes to the database makes it a convenient marker of application usage.

Some embodiments of the present invention may include one, or more, of the following operations, features, characteristics and/or advantages: (i) a new software signature type, which allows machine logic to discover use of an application based on changes in the content of the database table(s) used by the application; (ii) allows machine logic to assess the scope of use and therefore differentiate between "stand by" and "full use" application instances; (iii) may include, for example, triggers on Create, Read, Update, Delete operations to determine: (a) if an application meant to be monitored is used, and/or (b) frequency of operations provide information about scope and/or amount of use; (iv) uses database changes as an indication of application usage; (v) determination of application status (for example, "not running," "stand by," and "full use) can be made based on factors such as: (a) change in database object count, (b) number of rows of particular tables, and/or (c) length of data stored in a table, which is the amount of data in predetermined cell(s) of a table style database; and/or (vi) determination of application status (for example, "not running," "stand by," and "full use) can be made based on, for example, a Data Definition Language (DDL) trigger that marks changes upon execution. Further with respect to item (vi), created triggers will: (a) run (execute) before every insert, update, read or delete operations, and (b) will store operations history, what type of operation was performed, when and affected tables.

An embodiment that uses a first approach will now be discussed. By using a "database own" mechanism for tracking changes like tracking auditing information by various database implementation software/systems services and/or various server software assets management agent software/systems/services. These kinds of software can access database instrumentation for tracking data changes and, based on such, data analysis can calculate usage.

An embodiment that uses a second approach will now be discussed. SAM Agent creates a DLL trigger on the table and while triggered it is adding timestamp to additional table. SAM Agent is reading additional table and based on entries is calculating usage.

An embodiment that uses a third approach will now be discussed. In case database is not available in the edit mode the Software Asset Management (SAM) Agent is checking the current database number of database objects and/or running SQL commands that counts the length of data, it is similar to hash sum of a file but instead of a file it is performed on a table. Hash sum is compared with the previous hash sum and in case they differ application was used in the time between scans. Frequency of scans allows to fine tune the approach for accuracy.

Figure 5:
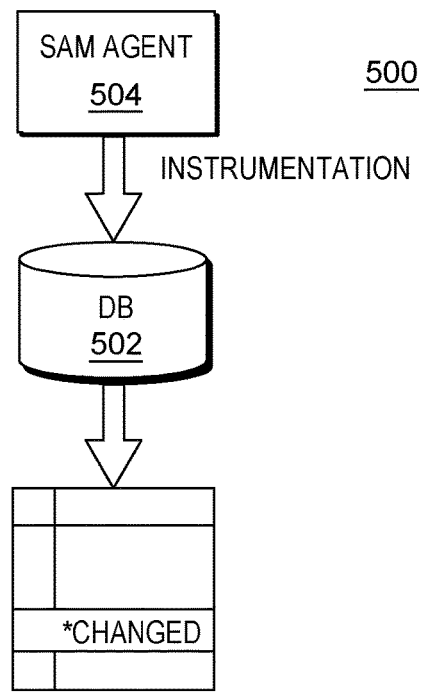
FIG. 5 is a block diagram view of a second embodiment of a system according to the present invention.

System 500, shown in FIG. 5, includes: database 502 and SAM Agent 504. The Software Asset Management Agent, responsible for the database scanning and looking for changes interacts with the database meant to be monitored. Based on the outcome of the interaction (verification if there are changes) the agent marks that an application is used or not.

Figure 6:
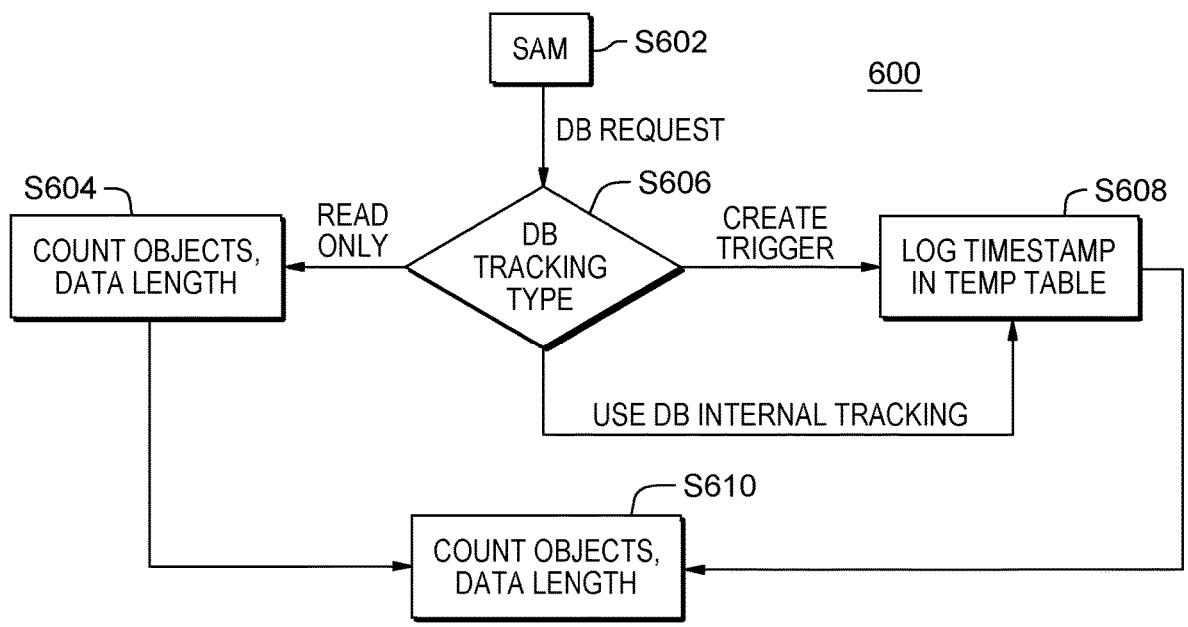
FIG. 6 is a flowchart showing a second embodiment method performed, at least in part, by the first embodiment system.

Method 600, shown in FIG. 6, includes the following operations (with process flow among and between the operations being shown by arrows in FIG. 6): S602, S604, S606, S608 and S610. Method 600 is performed by system 500. The Software Asset Management Agent, responsible for the database scanning and looking for changes may interact with the database meant to be monitored in various ways. 1) If read-only access is allowed, then the agent only checks for readable information—counts objects (rows, tables, triggers, etc.) or data length in a particular table field. Output of this analysis is then saved/stored to a temporary database with a timestamp marking the moment of scan. 2) If it is possible to write data to a database, then a) the agent checks if database engine is equipped with any native (provided by vendor) mechanism allowing to track changes over database and reads information from there, saving the information of such analysis in the same database (as the write access is available) or a temporary database, both with a timestamp marking the moment of scan; b) if there is no native mechanism to track changes over the database, then the agent creates e.g. a trigger (with a condition/clause indicating important operation type (on update, on delete, etc.) which will allow to capture changes made to the database. Data produced by the trigger is to be saved in the same database (as the write access is available) or a temporary database, both with a timestamp marking the moment of scan.

An embodiment of a computer-implemented method for discovering software usage based on content changes within a database table includes the following operations (not necessarily in the following order): (i) identifying a first database table, wherein the database table is associated with a first application; (ii) determining a set of signature characteristics for the first application, wherein the set of signature characteristics includes a change in database object count, the number of rows within the first database table, the length of data stored in the first database table, and a set of data definition language triggers; (iii) monitoring the set of signature characteristics at the first database table; (iv) determining the set of signature characteristics has been adjusted; (v) determining that the adjusted set of signature characteristics meets a set of criteria; and (vi) notifying a user that the set of criteria has been met for the first application. It is noted that many embodiments will involve more than one data table and/or more than one application, which is why the word "first" is used to describe the database table and the application in this example, even though some embodiments may have only one database table and/or only one application. Similar usage of the word "first" occurs throughout this document.

Some embodiments of the present invention may include one, or more, of the following operations, features, characteristics and/or advantages: (i) the set of data definition language triggers include operations to execute one or more of create, read, update, and delete operations; (ii) the set of criteria further includes a threshold to determine that the first application is in a state of full use; and/or (iii) the determination of the set of signature characteristics has been adjusted includes the following sub-operations (not necessarily in the following order): (a) generating a first hash sum from the set of signature characteristics at a first time period, (b) generating a second hash sum from the set of signature characteristics at a second time period, (c) comparing the first hash sum and the second hash sum, and (d) determining that the first hash sum and the second hash some are not identical.

An embodiment of a computer-implemented method for discovering software usage based on content changes within a database table includes the following operations (not necessarily in the following order): (i) identifying database table associated with an application and determining a set of signature characteristics (change in database object count, the number of rows within the database table, the length of data stored in the database table, and a set of data definition language triggers (operations to execute one or more of create, read, update, and delete operations)) for the application; (ii) generating a hash sum from the set of signature characteristics for a time period, generating a second hash sum from the set of signature characteristics at another time period, comparing the first hash sum and the second hash sum for identifying application usage in the time between scans; and (iii) monitoring the set of signature characteristics in the database table for any adjustments of the signature characteristics, and notifying a user if the adjusted set of signature characteristics meets a set of criteria and using a threshold for determining the full use state of the application. The threshold may be a threshold value of many different kinds of attributes and/or parameters of the subject running application. The attribute measured against the threshold value may, in some embodiments, depend, at least in part, on the business goal covered. The threshold may be related to/associated with any important aspect of the application monitored, which can be given a quantity (for example, for some business cases the threshold may be a number of users using the application, for others it may be the number of operations triggered by users). Another simple example follows: if an exemplary application monitored is an extensive, expensive system to store a knowledge base for internal company users, then not raising number of users (as company does not grow significantly) may not be a warning factor, but lowering, static or very slowly raising number of request issued entered into search engine may indicate that the application is not used by employees (for example, due to any of a wide variety of possible reasons, such as its features, its complexity, etc.), so its business sense is questionable.

Some embodiments of the present invention may include one, or more, of the following operations, features, characteristics and/or advantages: (i) depends on database changes (as opposed to changes in executable files and information about them stored in database); (ii) database is only used as mechanism to store data, rather than as a source of use information; (iii) uses frequency of database operations, along with their specific type and per type threshold in order to determine scope of application use; (iv) use of software signatures allows differentiation between editions/flavors of the software along with intensity of use, which may help to differentiate between backup/dev/production scope of use; and/or (v) use changes in specific tables in a database as a sign of specific use information.

Some embodiments of the present invention may depend on "database changes." This is not to be confused with currently conventional art that refers to executable files and information about the executable files that is stored in database. This difference between a "database change" and a change to information about executable files that is stored in a database will now be discussed in the following paragraph(s).

In the solutions in all three (3) of the approaches described, above, machine logic: (i) monitors a given database used by a given application; and (ii) based on the changes in the content of the database, detects if the given application has been used or not (with respect to some predetermined time interval). Some embodiments of the present invention monitor a database of used by an application as the application operates, and determines changes in the application-associated database, as contrasted with other approaches that monitor the running of executable files of an application.

There are several different types of "database changes," including the following types: (i) CREATE type changes, (ii) DELETE type changes, (iii) UPDATE type changes, (iv) MERGE type changes, and/or (v) READ type changes (it should be understood that READ operations do not actually modify the database content, but they are included here as a type of "database changes" because read operations can be monitored and use of an application associated with a database).

Some embodiments of the present invention may include one, or more, of the following operations, features, characteristics and/or advantages: (i) the new type of signature used by some embodiments of the present invention describe exactly, and on a per product basis, what should be monitored (for example, what thresholds, what type of operation and on what database tables to "match" the signature); (ii) for example: (a) Product X, if used will create new rows in table X, (b) if these new rows are created more frequently than X per sec, than and "enterprise" scope and/or volume of use is detected, and (c) if the use is limited to may be 0.01X per second, then this is taken as an indication of "test" or "dev" use scope; and/or (iii) parameters that may be measured to create such signatures may include: number of tables in the database, row count in specific tables (that is, row count in tables used by the application of interest), length of data stored in a table, size of database, edition, or version, of a database, number of operations, type of operations, and/or time frame of operations. While the example discussed in this paragraph includes a specific time definition expressed in "seconds," alternatively and/or additionally: (i) other units of time could be used; and/or (ii) qualitative descriptions could be used (for example, "heavy use", "moderate use", "light use").

The parameters mentioned in item (iii) of the list in the preceding paragraph will now be discussed in more detail. A typical example of an application action that would cause a new table to be created in the database associated with the application is as follows: application creates temp tables in the database, which leads to increases in the table count and may be used as a parameter change indicating that the application is running. A typical example of an application and action that would cause an existing table to be deleted occurs when an application deletes a temp table.

The "time frame of operations," as mentioned in item (iii) in the list two paragraphs previous, will now be discussed. Time frame of the database operations can be used as a basis for determining how intensive the use of the application is and let the machine logic differentiate between, for example, use of a backup instance of the application versus use of a production instance of the application.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Signature: for purposes of this document, a "signature" refers to any one or more of the following signature types: (i) a specific set made of any elements (definitions of tables, triggers, rows, cells, functions, etc.) present in a database being a part of the subject application meant to be monitored; and/or (ii) a specific set of entries in the elements (contents of tables, cells; definitions of triggers, functions) of that database c) a specific set of modifications (added or removed row, column, cell; modified definition of a function, trigger, etc.) performed on elements of that database which allow to uniquely indicate that the particular application is present, active and by the fact of modifications performed on these specific elements it consists of—is in fact used. Non-limiting, illustrative examples follow: (i) an application "A" may be known as associated with a database having a static set of tables, triggers, functions, etc. with known names, definitions, but when used it may be adding rows to those tables having specific entries, values, etc.—its signature will be information on its static elements and the fact that it adds rows in a specific way; and (ii) an application "B" may be known as associated with a database having a static set of triggers, functions, etc. with known names, definitions, but when used, it may be consecutively adding new tables, for example, having a specific names (for example, deriving from day, date, time)—its signature will be information on its static elements and the fact that it adds new tables in a specific way.

What is claimed is:

1. A computer-implemented method (CIM) comprising:
receiving first application data indicating that use of a first application by users is characterized by a first software signature that includes: (i) a static set of tables, triggers and functions with known names and definitions that are present in databases with which the first application interacts, and (ii) specific entries and values in rows added to databases with which the first application interacts;
logging a plurality of change operations on a first database to obtain a first database change log; and
determining that the first application has been used in conjunction with the first database based, at least in part, upon the first database change log matching the first software signature associated with the first application;
the determination of the first usage state of the first application is based on the first software signature, which allows machine logic to discover use of the first application based on changes in the content of the first database used by the first application; and
the plurality of change operations includes at least the following types of change operations: change in database object count, change in number of rows of a set of table(s), and length of data stored in a set of table(s).

2. A computer program product (CPP) comprising:
a set of storage device(s); and
computer code stored collectively in the set of storage device(s), with the computer code including data and instructions to cause a processor(s) set to perform at least the following operations:
receiving first application data indicating that use of a first application by users is characterized by a first software signature that includes: (i) a static set of tables, triggers and functions with known names and definitions that are present in databases with which the first application interacts, and (ii) specific entries and values in rows added to databases with which the first application interacts;
logging a plurality of change operations on a first database to obtain a first database change log; and
determining that the first application has been used in conjunction with the first database based, at least in part, upon the first database change log matching the first software signature associated with the first application;

the determination of the first usage state of the first application is based on the first software signature, which allows machine logic to discover use of the first application based on changes in the content of the first database used by the first application; and
the plurality of change operations includes at least the following types of change operations: change in database object count, change in number of rows of a set of table(s), and length of data stored in a set of table(s).

3. A computer system (CS) comprising:

a processor(s) set;

a set of storage device(s); and computer code stored collectively in the set of storage device(s), with the computer code including data and instructions to cause the processor(s) set to perform at least the following operations:

receiving first application data indicating that use of a first application by users is characterized by a first software signature that includes: (i) a static set of tables, triggers and functions with known names and definitions that are present in databases with which the first application interacts, and (ii) specific entries and values in rows added to databases with which the first application interacts;

logging a plurality of change operations on a first database to obtain a first database change log; and determining that the first application has been used in conjunction with the first database based, at least in part, upon the first database change log matching the first software signature associated with the first application;

the determination of the first usage state of the first application is based on the first software signature, which allows machine logic to discover use of the first application based on changes in the content of the first database used by the first application; and the plurality of change operations includes at least the following types of change operations: change in database object count, change in number of rows of a set of table(s), and length of data stored in a set of table(s).

\* \* \* \* \*